United States Patent
Carlsson et al.

(10) Patent No.: US 8,418,898 B2
(45) Date of Patent: Apr. 16, 2013

(54) HARNESS FOR POWER TOOL HAVING A POLE

(75) Inventors: Daniel Carlsson, Jönköping (SE); Gösta Arvidsson, Huskvarna (SE)

(73) Assignee: Husqvarna Akitebolag, Huskvarna (SE)

( * ) Notice: Subject to any disclaimer, the term of this patent is extended or adjusted under 35 U.S.C. 154(b) by 469 days.

(21) Appl. No.: 12/601,791

(22) PCT Filed: Jun. 1, 2007

(86) PCT No.: PCT/SE2007/000533
§ 371 (c)(1),
(2), (4) Date: Jun. 30, 2010

(87) PCT Pub. No.: WO2008/147259
PCT Pub. Date: Dec. 4, 2008

(65) Prior Publication Data
US 2010/0264188 A1   Oct. 21, 2010

(51) Int. Cl.
*A45F 3/14* (2006.01)
(52) U.S. Cl.
USPC ........... 224/162; 224/254; 224/262; 30/296.1
(58) Field of Classification Search .................. 224/162, 224/254, 262; 30/296.1
See application file for complete search history.

(56) References Cited

U.S. PATENT DOCUMENTS

| | | | | |
|---|---|---|---|---|
| 2,469,978 A | * | 5/1949 | Mrozinski | 242/379.2 |
| 3,317,098 A | * | 5/1967 | Auraen | 224/609 |
| 3,346,955 A | * | 10/1967 | Beneke | 30/276 |
| 3,424,422 A | * | 1/1969 | Klangos | 248/561 |
| 3,886,658 A | * | 6/1975 | Wikoff | 30/388 |
| 4,483,070 A | | 11/1984 | Junkermann | |

(Continued)

FOREIGN PATENT DOCUMENTS

| | | |
|---|---|---|
| DE | 667986 C1 | 11/1938 |
| GB | 2028624 A | 3/1980 |

(Continued)

OTHER PUBLICATIONS

International Search Report for International Application No. PCT/SE2007/000533; dated Jan. 9, 2008; 4 pages.

(Continued)

*Primary Examiner* — Justin Larson
(74) *Attorney, Agent, or Firm* — Novak Druce Connolly Bove + Quigg LLP (57) ABSTRACT

A harness (10) for reducing the load on the arms of operator working with a pole saw or pole hedge trimmer at operating positions at angles particularly between 10 to 105 degrees from a vertical line, in which the power tool (1) is suspended in a strap (31) extending from a front portion (12) of the harness (10), through at least one fairlead (6) provided on the power tool (1) and to a rear portion (11) of the harness (10). The strap (31) is included in a tool balancer (30), which includes a spring loaded reel (32) for the strap (31) and is attached to or preferably integrated with a chest plate/buckle (14) in the harness (10), and which permits locking of the reel (32). The at least one fairlead (6) includes a hook (8) for easy hooking of the power tool (1) onto the strap (31) and unhooking of the same therefrom.

23 Claims, 9 Drawing Sheets

U.S. PATENT DOCUMENTS

| | | | |
|---|---|---|---|
| 6,158,636 A * | 12/2000 | Latiolais | 224/258 |
| 6,247,624 B1 * | 6/2001 | Rundberg | 224/259 |
| 7,357,284 B2 * | 4/2008 | Jauvin | 224/660 |
| 2006/0179806 A1 | 8/2006 | Maier et al. | |

FOREIGN PATENT DOCUMENTS

| | | |
|---|---|---|
| SE | 520705 C2 | 8/2003 |
| WO | 03051100 A1 | 6/2003 |
| WO | 2008/147259 A1 | 12/2008 |

OTHER PUBLICATIONS

Written Opinion of the International Searching Authority for International Application No. PCT/SE2007/000533; dated Jan. 9, 2008; 7 pages.

International Preliminary Report on Patentability for International Application No. PCT/SE2007/000533; dated Apr. 21, 2009; 5 pages.

* cited by examiner

HARNESS FOR POWER TOOL HAVING A POLE

TECHNICAL FIELD

The present invention relates to improvements in equipment for tree care or hedge trimming More specifically, the present invention relates to a method of reducing the load on the arms of an operator, who wears a harness, in which a hand-held power tool for tree care or hedge trimming is suspended, said power tool having a pole, a power source mounted at one end of the pole, and a tool driven by the power source and mounted at the other end of the pole.

The invention also relates to a harness, in which a hand-held power tool for tree care or hedge trimming is intended to be suspended, said power tool having a pole, a power source mounted at one end of the pole, and a tool driven by the power source and mounted at the other end of the pole, said harness having a front portion and a rear portion. But it may also be suitable for brush cutters, clearing saws, grass trimmers etc.

Further, the invention relates mainly to a hand-held power tool for tree care or hedge trimming, said power tool having a pole, a power source mounted at one end of the pole, and a tool driven by the power source and mounted at the other end of the pole, and said power tool being intended to be suspended in a harness worn by an operator of the hand-held power tool.

Still further, the invention relates to a chest plate and tool balancer assembly for a harness, in which a hand-held power tool for tree care or hedge trimming is intended to be suspended.

BACKGROUND ART

Hand-held power tools for tree care or hedge trimming have a pole, a power source such as an engine or an electric motor mounted at one end of the pole, and a tool such as a chain saw or a hedge trimmer driven by the power source and mounted at the other end of the pole. Examples of a pole saws are models 326P4 and 326P5x that are available from Husqvarna AB, and examples of pole hedge trimmers are models 326HE3x and 326HE4x, likewise available from Husqvarna AB (http://international.husqvarna.com). To relieve the arms of a user from the weight of the hand-held power tool, it is suspended in a harness worn by the user. However, when the power tool has a lifting eye located substantially at the center of gravity of the power tool in order to balance the weight of the power source against the weight of the tool, there usually will be too long a distance to a rear grip on the power source end of the pole to give a comfortable working position for the operator. Working with such hand-held power tools for tree care or hedge trimming at angles of 10 to 105 degrees from a vertical plane, will result in a very large load primarily on the other arm holding the tool in a second grip closer to the tool end of the pole, and long working periods will be impossible.

Harnesses, in which a hand-held power tool is intended to be suspended, are known in a variety of models. A harness developed for use with a clearing saw or the like is disclosed in U.S. Pat. No. 6,247,624 B1 (Rundberg) and includes a supporting rope having one end connected to a back plate of the harness and the other end connected to a breast plate of the harness. The rope passes slidingly through a tubular passage provided in a hip pad having a hook, from which the power tool is suspended.

U.S. Pat. No. 2,208,962 (de Finetti) discloses a load bearing apparatus for transport on shoulders, and U.S. Pat. No. 3,327,788 (Kolpe) discloses a harness for an earth boring machine, where the load bearing apparatus of the '962 patent appears to be included in the harness.

DE 667 986 (Bräuer) discloses another load bearing apparatus for mechanically powered tools, where the tool is suspended in a rubber rope extending through a steel tube, which is fixed to a rear portion of a waist strap of a harness and curves over a shoulder of the tool operator.

SE 54 783 (Goldschmidt) discloses another apparatus for facilitating the use of comparatively heavy hand-held tools, particularly mechanically powered hand-held hammers. This apparatus is connected to the tool as well as to a part of the operator's body, in a way that when the operator presses the tool against a workpiece by means of the apparatus, the apparatus will also exert a lifting force on the tool.

UK patent application GB 2 399 564 A (Prosser) relates to a safety system, particularly suitable for workers in the building trade and comprises a housing, which is secured to a belt or harness worn by the worker. Each housing comprises a reel, on which a flexible cord is wound. Means are provided for releasably securing the flexible cords to the tools.

The cord may be unwound from the reel, so that the tool can be used, and then the cord is automatically rewound onto the reel, when the external force on the cord is released. The reel may be controlled by a spring secured to the housing. Means are preferably provided for locking the reel mechanism after the cord has been extended. This safety system reduces the risk of persons being injured by tools dropped from a substantial height.

U.S. Pat. No. 2,282,653 (Herzmark) discloses a surgical traction tool of a design that makes it useful as an aid in maintaining a tool oriented in a desired position. The apparatus has a strap reeled on a drum, inside which a flat coiled spring is located. Further, the apparatus has a rotatable lever, by means of which by means of which the amount of tension applied to the coiled spring may be adjusted, independent of the unwound length of the strap.

An other type of mechanism for paying out a desired length of a strap or the like and then rewinding it by means of a tensioned spring is used in safety belts for vehicles, particularly motor cars, see U.S. Pat. No. 4,290,564 (Karlsson), for example.

DISCLOSURE OF THE INVENTION

An object of the present invention is to improve the equipment used by an operator so as to reduce the large loads that may occur particularly when working with such hand-held power tools preferably for tree care or hedge trimming at angles of 10 to 105 degrees from a vertical line, so that extended working periods will not harm the operator.

In the method referred to in the first paragraph above, this object is achieved by
  providing a harness having a front portion provided with a tool balancer, said tool balancer including a strap, a rotatable reel, on which at least part of the strap is wound, and a spring, at least indirectly connected to the strap for balancing the weight of the power tool to a desired extent,
  providing on the power tool two fairleads for the strap, a first one of the two fairleads being located by the power source end of the pole, and the second one being located spaced therefrom toward the tool end of the pole,
  inserting the strap through the two fairleads and attaching the strap to a rear portion of the harness, and
  adjusting the longitudinal position of said second fairlead along the pole, if desired, and setting the spring to balance the weight of the power tool to a desired extent, if necessary.

In the harness referred to in the second paragraph above, this object is achieved in that the harness comprises a tool balancer attached to said front portion, said tool balancer including a strap, a rotatable reel, on which at least part of the strap is wound, a spring, at least indirectly connected to the strap for balancing the weight of the power tool to a desired extent, said strap having a free end adapted to be attached to said rear portion of the harness, and said strap further being intended to extend through at least one fairlead provided on the power tool in order to suspend the power tool in the strap.

In the hand-held power tool referred to in the third paragraph above, this object is achieved in that the power tool has two fairleads for a strap that is attached to the harness and has a free end that is adapted to pass through the two fairleads and be attached to a rear portion of the harness, a first one of the two fairleads being located by the power source end of the pole, and the second one being located spaced therefrom toward the tool end of the pole.

In the chest plate and tool balancer assembly referred to in the fourth paragraph above, this object is achieved in that the tool balancer is integrated in the chest plate.

A fairlead is a device to guide a line, rope, cable or strap around an object or out of the way, or to stop it from moving laterally. Typically a fairlead will be a ring or hook. The fairlead may be a separate piece of hardware, or it could be a hole in the structure. If the line is meant to be moved while in the fairlead, the angle in the line created by the fairlead must be shallow to minimize friction. For larger angles a block or pulley is used as a fairlead to reduce friction.

The wording strap in the content of the present invention is not intended to be limited mere to a flat band, even though it is the preferred embodiment; for instance cords, strings, ropes, cables may provide equivalent functionality.

In a preferred embodiment of the present invention, the strap is intended to extend through two longitudinally spaced fairleads provided on the power tool, a first one of said two fairleads being located by the power source end of the pole, and a second one being located spaced therefrom toward the tool end of the pole. While a suspension of the power tool in a single point will reduce the load from the weight of the power tool on the operator's arms, a suspension of the power tool in two points instead of a single point, will permit extended working periods without risk of harming the operator The two fairleads preferably include hooks for easy hooking of the power tool onto the strap and unhooking of the same therefrom.

Preferably, the tool balancer reel is lockable, and the spring exerts a substantially constant rewinding force on the strap irrespective of how much of the strap that is unwound from the reel, as known from other load carrying devices To achieve a proper balancing of the power tool, so as to reduce the load on the forward extended arm of the operator, means may be provided for adjusting the location of at least the second one of the two fairleads in the longitudinal direction of the pole.

Further, the tool balancer preferably is attached in a position corresponding to an upper middle of the chest but fairly high, somewhat below the shoulders of the operator, and the harness has a back plate, to which the free end of the strap is attached.

To fulfill high demands for power tool mobility both sideways and vertically, the harness suitably has a back plate and a chest plate, two shoulder straps, one for each shoulder of the operator, connecting the back plate with the chest plate, and a generally horizontal side strap located on the opposite side of the operator's chest in relation to the power tool and likewise connecting the back plate with the chest plate. The chest plate is located in a position corresponding to an upper middle of the chest but fairly high, somewhat below the shoulders of the operator, the tool balancer is attached to or preferably integrated with the chest plate, and the free end of the strap for carrying the power tool is attached to the back plate.

BRIEF DESCRIPTION OF THE DRAWINGS

In the following, the invention will be described in more detail with reference to preferred embodiments and the appended drawings.

MODE(S) FOR CARRYING OUT THE INVENTION

Figure 1:
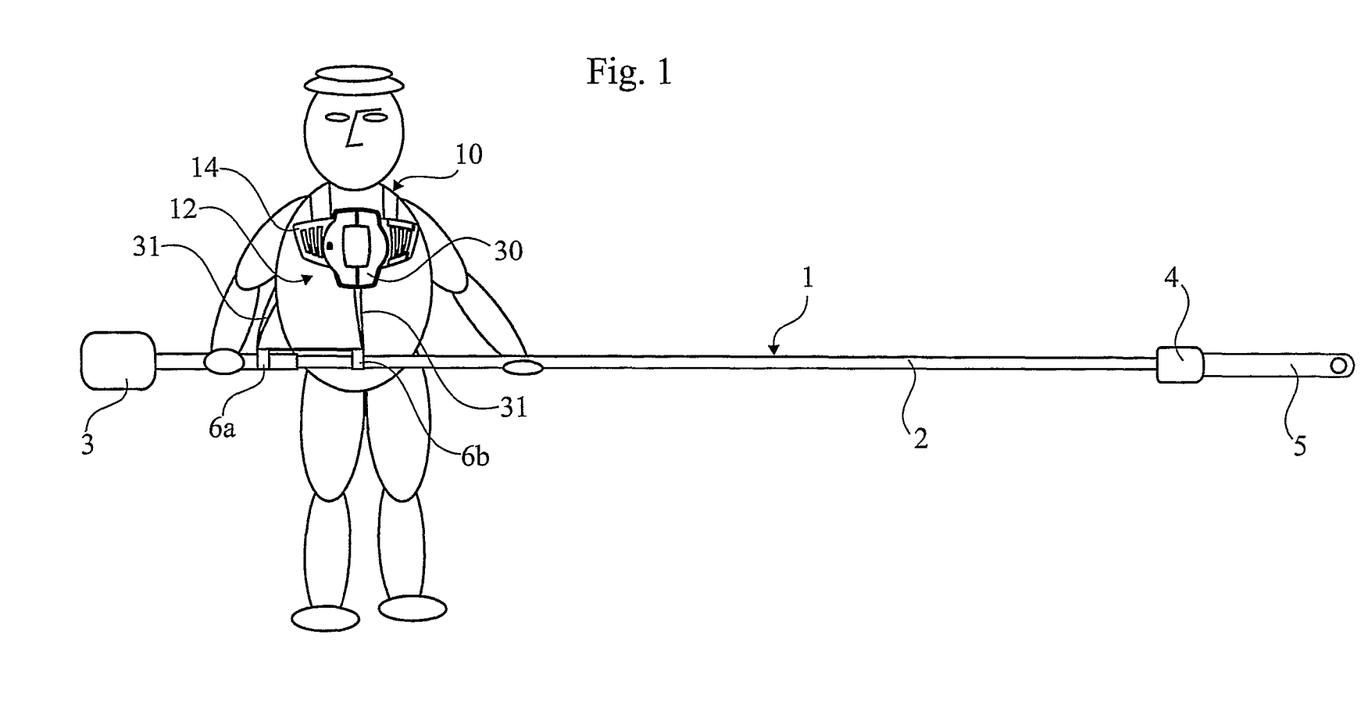
FIG. 1 is a simple sketch showing an operator holding a power tool, here a pole saw for tree care, suspended from a harness in accordance with one embodiment of the present invention worn by the operator.

FIG. 1 is a simple sketch showing an operator holding a power tool 1 having a pole 2, a power source 3 mounted at one end of the pole, and a tool 4 driven by the power source 3 and mounted at the other end of the pole 2. As a rule the power source 3 is a two-stroke engine, but also four-stroke engines are used, and electric motors may be used. In the embodiment shown in FIG. 1, the tool 4 is a chain saw for tree care, but the tool might also be a hedge trimmer for trimming a hedge. While a pole saw for tree care usually has the guide bar 5 for the chain saw fixed to extend in the longitudinal direction of the pole 2, a hedge trimmer usually is mounted to extend at a variable angel in relation to the longitudinal direction of the pole. To reduce the load on the arms of the operator, particularly when working with a pole saw or pole hedge trimmer, he wears a harness 10, in which the hand-held power tool 1 for tree care or hedge trimming is suspended. However, with prior art equipment, work with power tool operating positions at angles particularly between 10 to 105 degrees from a vertical line still becomes strenuous to the operator.

According to one aspect of the present invention, this problem is solved by:

providing a harness 10 having a front portion 12 provided with a tool balancer 30, said tool balancer 30 including a strap 31, a rotatable reel 32, on which at least part of the strap 31 is wound, and a spring 33, at least indirectly connected to the strap 31 for balancing the weight of the power tool 1 to a desired extent, providing on the power tool 1 two fairleads 6 for the strap 31, a first one 6a of the two fairleads being located by the power source end of the pole 2, and the second one 6b being located spaced therefrom toward the tool end of the pole 2, inserting the strap 31 through the two fairleads 6 and attaching the strap to a rear portion of the harness, and adjusting the longitudinal position of said second fairlead 6b along the pole 2, if desired, and setting the spring 33 to balance the weight of the power tool 1 to a desired extent, if necessary.

The harness 10 has a rear portion 11 and a front portion 12, and in accordance with another aspect of the present invention it comprises a tool balancer 30 attached to the front portion 12. The tool balancer 30 includes a strap 31, a rotatable reel 32, on which at least part of the strap is wound, and a spring 33, at least indirectly connected to the strap 31 for balancing the weight of the power tool 1 to a desired extent. The strap 31 has a free end adapted to be attached to the rear portion 11 of the harness 10 and is intended to extend through at least one fairlead provided on the power tool 1.

Figure 2:
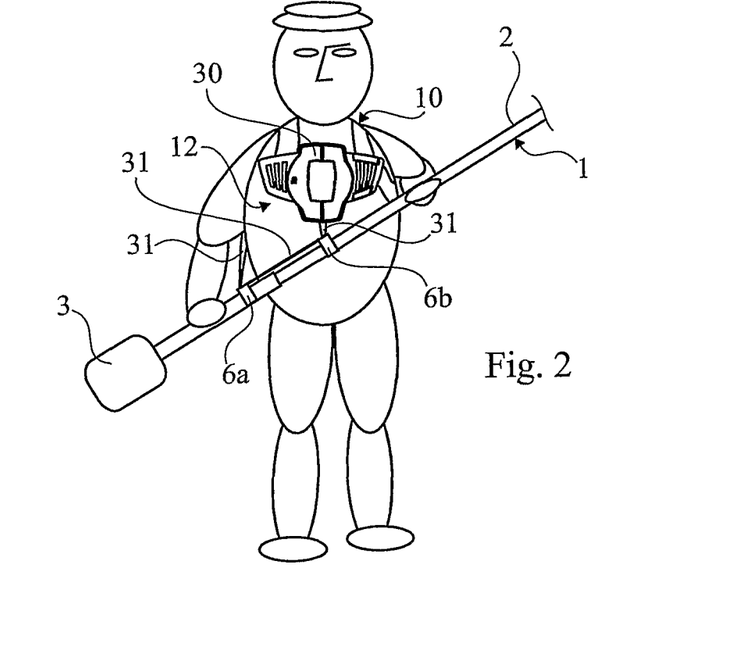
FIGS. 2 and 3 are simple sketches similar to FIG. 1 and showing how the suspension changes with the orientation of the pole.
Figure 3:
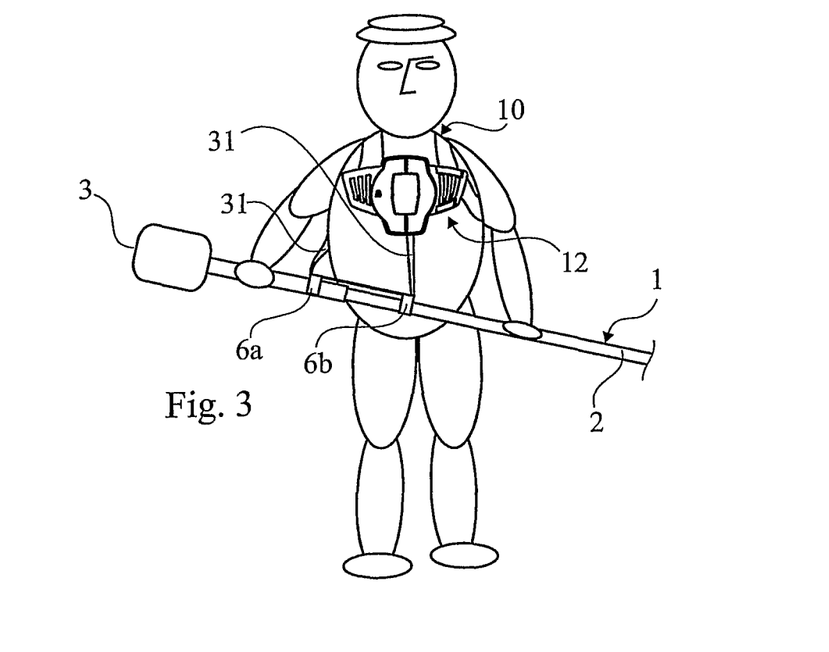

In prior art (e.g. GB 2 399 564) harnesses, the free end of the strap is provided with a hook that is adapted to engage with a ring, which is mounted in a fixed position on the power tool. However, while a single suspension point may be sufficient for less strenuous jobs of short duration, the strap 31 preferably is intended to extend through two longitudinally spaced fairleads 6 provided on the power tool 1. A first one 6a of said two fairleads is located by the power source end of the pole 2, and a second one 6b is located spaced therefrom toward the tool end of the pole 2. By attaching the free end of the strap 31 to the rear portion 11 of the harness 10, the power tool 1 may slide on the strap 31 while hanging in the fairleads 6 as shown in FIGS. 2 and 3, so as to enable working with a wide variety of tool angles relative the vertical line without the tool angle becoming strenuous to the operator.

Figure 4:
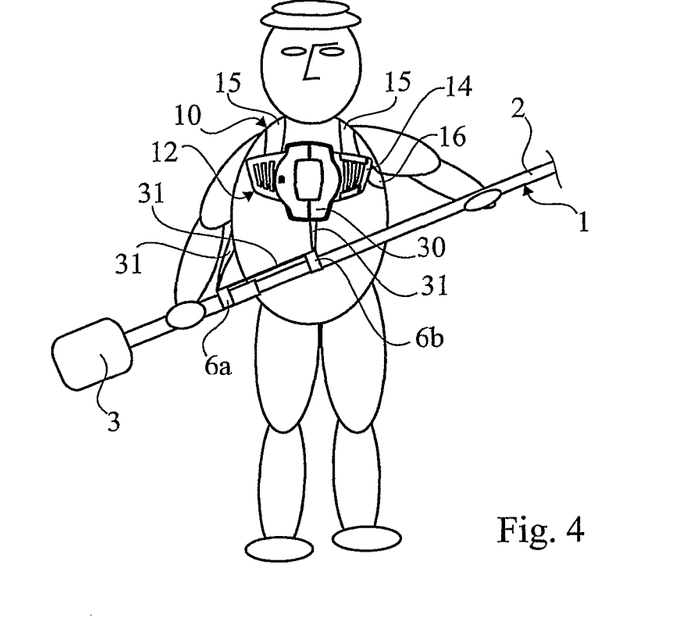
FIGS. 4 and 5 are simple sketches showing a front view and a rear view, respectively, of the operator wearing the harness, from which a power tool is suspended.
Figure 5:
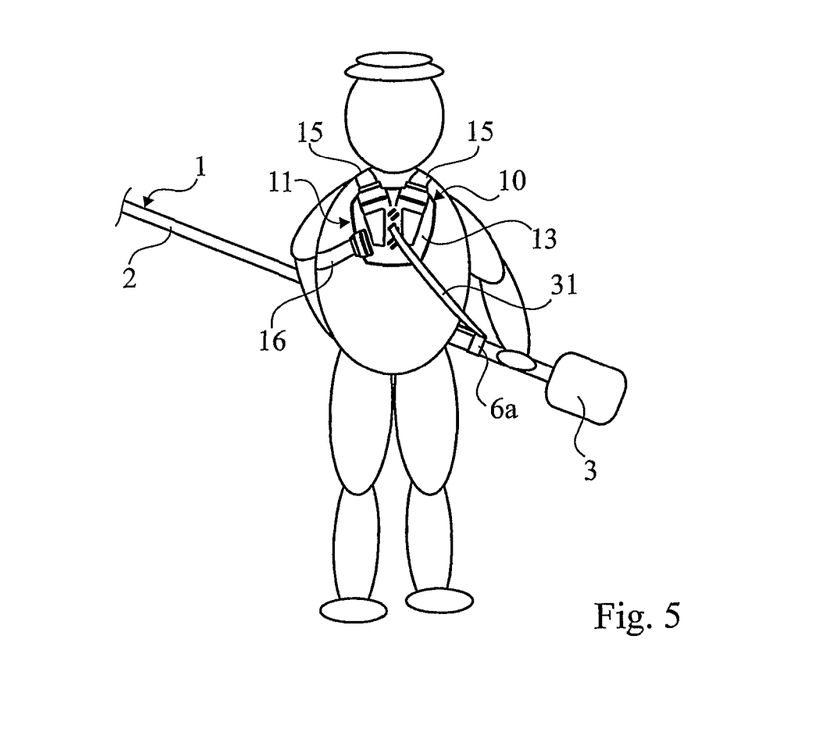

As best shown in FIGS. 4 and 5, the harness 10 preferably has a back plate 13 and a chest plate 14, two shoulder straps 15, one for each shoulder of the operator, connecting the back plate 13 with the chest plate 14. Further, the harness 10 preferably has a generally horizontal side strap 16 located on the opposite side of the operator's chest in relation to the power tool 1 and likewise connecting the back plate 13 with the chest plate 14. The chest plate 14 is located in a position corresponding to an upper middle of the chest but fairly high, somewhat below the shoulders of the operator, the tool balancer 30 is attached to the chest plate 14, and the free end of the strap 31 for carrying the power tool 1 is attached to the back plate 13. Preferably all of the straps are adjustable.

Suitably, the chest plate is a buckle 14 and advantageously, in an embodiment not shown, the two shoulder straps 15 and the side strap 16 are two-part straps and include a wide strap portion fixed to the back plate 13 by being folded back upon itself around a portion of the back plate 13 and attached by sewing, and a narrower strap portion that is adjustably connected to the wide portion and has a free end provided with a latch, not shown, fitting in the buckle 14. The straps preferably are woven from suitable synthetic fiber material, such as Nylon, and the wide strap portions may have a width of about 6 centimeters and the narrower strap portions a width of about 3 centimeters. Also strap 31 for carrying the power tool 1 preferably is woven from suitable synthetic fiber material, such as Nylon, and may have a width of about 2 centimeters. To avoid that the weight of the power tool 1 will pull down the chest plate 14, so that the shoulder straps slide on the shoulders of the operator and pull up the back plate toward the back of his head, it is recommendable, but not shown, to provide on the rear portion 11 of the harness 10 a wide neck strap that has its two ends securely fixed to the two shoulder straps at locations on top of the shoulders, e.g. by sewing. By support from the neck, the neck strap will prevent the harness from being pulled over the shoulders downward along the chest.

Figure 6:
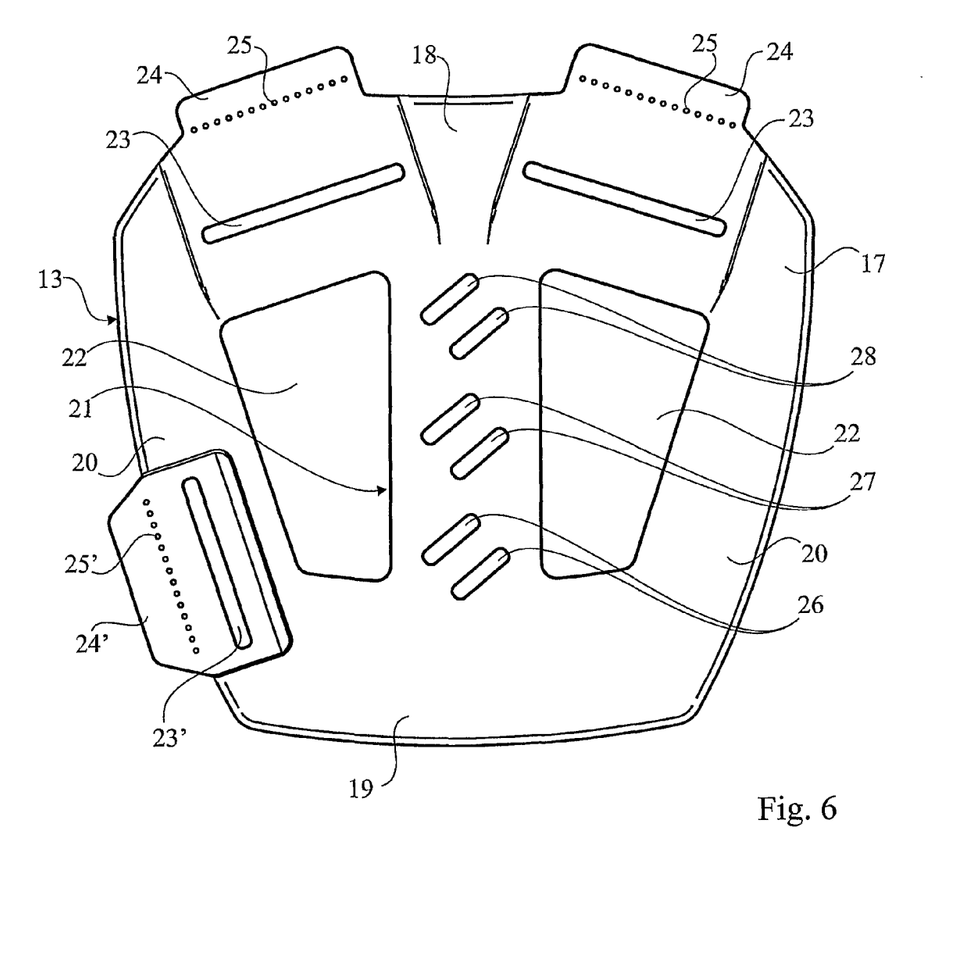
FIG. 6 is a front view of a back plate included in the harness.

In a preferred embodiment, the back plate 13 is shown in FIG. 6. It has a vertical frame 17 in the shape of a flat, generally square ring having a top member 18, a bottom member 19, and two side members 20. In the center of the frame 17, a flat, vertical member 21 is provided, which extends from the top member 18 to the bottom member 19. On both sides of the vertical, central member 21, two openings 22 are formed, which reduce weight and material consumption, and also increase ventilation of heat from the operator's back. Above the two openings 22, two slots 23 are provided in the top member 18 for enabling the shoulder straps 15 to be attached to the back plate 13. The slots 23 are dimensioned to make it possible to thread the two shoulder straps 15 therethrough. Then each shoulder strap 15 is folded back over itself and secured by sewing. The top member 18 of the frame 17 also has two strapwide but comparatively short tongues 24 provided with a series of bores 25, through which the sewing thread is intended to pass, however it would of course be possible not use the pre-made bores 25 and instead sewing straight through the plastic. The two slots 23 are oriented in such a way that the shoulder straps 15 will diverge in a direction toward the neck of the operator. A similar slot 23' with associated tongue 24' and series of bores 25' is provided in the left-hand side member 20 of the frame 17, and between the two openings 22, there are three pairs 26, 27, 28 of sloping slots provided at different levels in the vertical, central member. Each of these three pairs of sloping slots at different levels offers an attachment point for the strap 31, in which the power tool 1 is to be suspended. The shown back plate 13 is for a right-handed operator, but simply by turning it around a vertical axis, it will suit also a left-handed operator.

Figure 7:
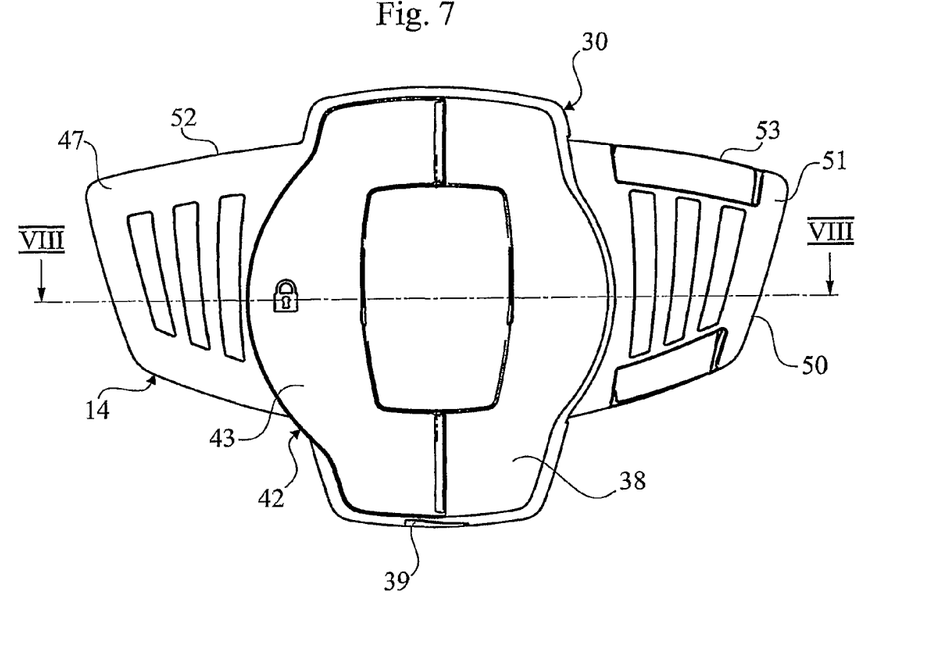
FIG. 7 is a front view of a chest plate included in the harness.
Figure 8:
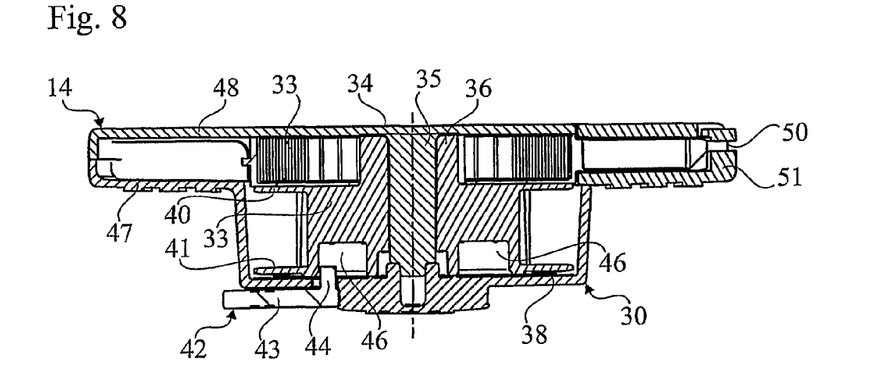
FIG. 8 is a cross-sectional view of the chest plate taken along line VIII-VIII in FIG. 7.
Figure 9:
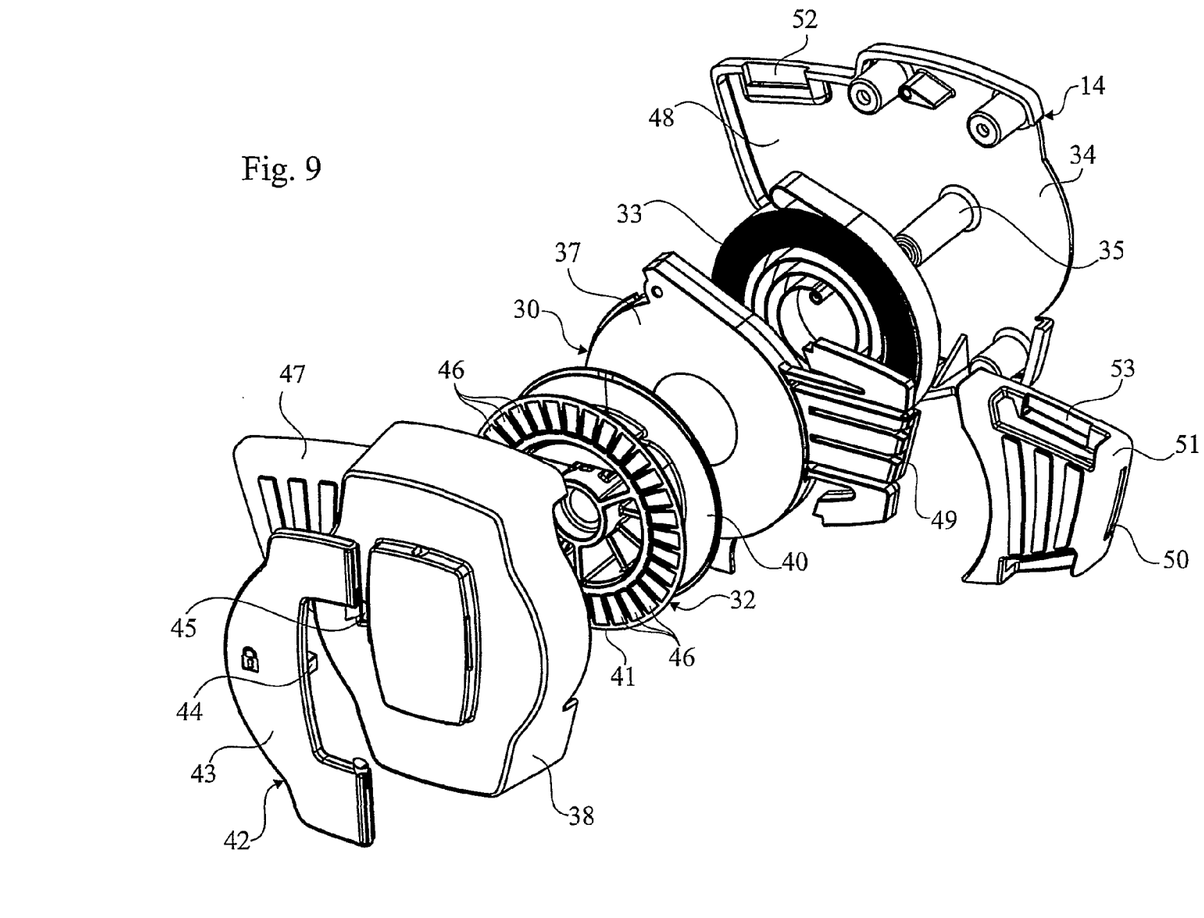
FIG. 9 is an exploded perspective view of the chest plate of FIGS. 7 and 8.

Even though the tool balancer 30 may be a separate component, which is attached to the chest plate 14, in the preferred embodiment shown in the drawings, the tool balancer 30 is integrated in the chest plate 14. The design of this component is best shown in FIGS. 7-9. The assembly comprises a base plate 34, from which a central shaft 35 projects. The rotatable reel 32 has a tubular shaft 36 extended toward the base plate 34 and journalled on the central shaft 35. A gap between the base plate 34 and the proper reel 32 houses a long, coiled spring 33, having an outer end attached to the base plate 34 and an inner end connected to the tubular shaft 36 of the rotatable reel 32 for rewinding the strap 31, which is at least partly wound on the reel 32. The coiled spring 33 is long to maintain the pulling force of the spring substantially constant, irrespective of how much of the strap 31 is paid out from the reel 32, i.e. irrespective of whether the power tool 1 is held substantially vertically and maybe also lifted so that the power source 3 is located a distance of about one foot from the operator's face, or is held substantially horizontally with the power source 3 removed far from the tool balancer 30. A cover 37 for the coiled spring is provided between the spring 33 and the rotatable reel 32. The coiled spring 33, the spring cover 37, and the reel with strap 31 wound thereon are covered by a cap 38 that is attached to the base plate 34 and has a bottom opening 39 (FIG. 7) permitting exit of strap 31. The axial position of the strap 31 on the reel 33 is controlled by two radial flanges on the reel, i.e. a rear flange 40 facing the cover 37 and a front flange 41 facing the cap 38. The central shaft 35 has a free end that is supported in a recess in the cap 38.

A mechanism for locking the reel 32 against rotation is provided and includes a locking member 42 mounted on a pivotal axis on the exterior of the cap 38. In the embodiment shown in FIGS. 7-9, the pivotal axis is vertical and located in the center of the cap 38, and the locking member 42 can be pivoted between a locked position on the right-hand side and an unlocked position on the left-hand side as view in the Figs. Further, in the shown embodiment, the locking member 42 includes a handle-shaped member 43 having a protruding peg 44, which in the locked position projects through an opening 45 provided in the cap 38 and engages a suitable one of a series of recesses or holes 46 provided in the front flange 41 of the reel 32. The attachment of the locking member 42 to the cap 38 is such that the locking member 42 is held by snap action in its two end positions. Of course, since other locking mechanisms are well known in the art, it would be possible to substitute another locking mechanism for the one described above In the embodiment shown in FIGS. 7-9, one side of the cap 38 has a projecting, wing-like member 47, and the base plate 34 has a matching wing-like member 48. On the opposite side with reference to the operator wearing the harness, the cover 37 for the spring is provided with a corresponding projecting member 49 having at least one hook for engaging at 50 with a latch 51 intended to be adjustably attached to a front end of the side strap 16. The shoulder straps 15 have latches, not shown, attached to the front ends of the shoulder straps 15, and these latches are intended to engage the buckle 14 at an upper edge of the wing member 48 of base plate 34 and at an upper edge of latch 51 at engagement points 52 and 53, respectively.

In accordance with still another aspect of the present invention, the hand-held power tool 1 has two fairleads 6 for a strap 31, which is attached to a front portion 12 of the harness 10 and has a free end that is adapted to pass through the two fairleads 6 and be attached to a rear portion 11 of the harness 10. A first one 6a of the two fairleads is located by the power source end of the pole 2, and the second one 6b is located spaced therefrom toward the tool end of the pole 2. Preferably, the two fairleads 6 include hooks for easy hooking of the power tool 1 onto the strap 31 and unhooking of the same therefrom. By attaching the free end of the strap 31 to the rear portion 11 of the harness 10, the strap 31 does not have to be provided with a hook for suspending the power tool 1, and the cost of manufacturing the harness can be reduced.

Figure 10:
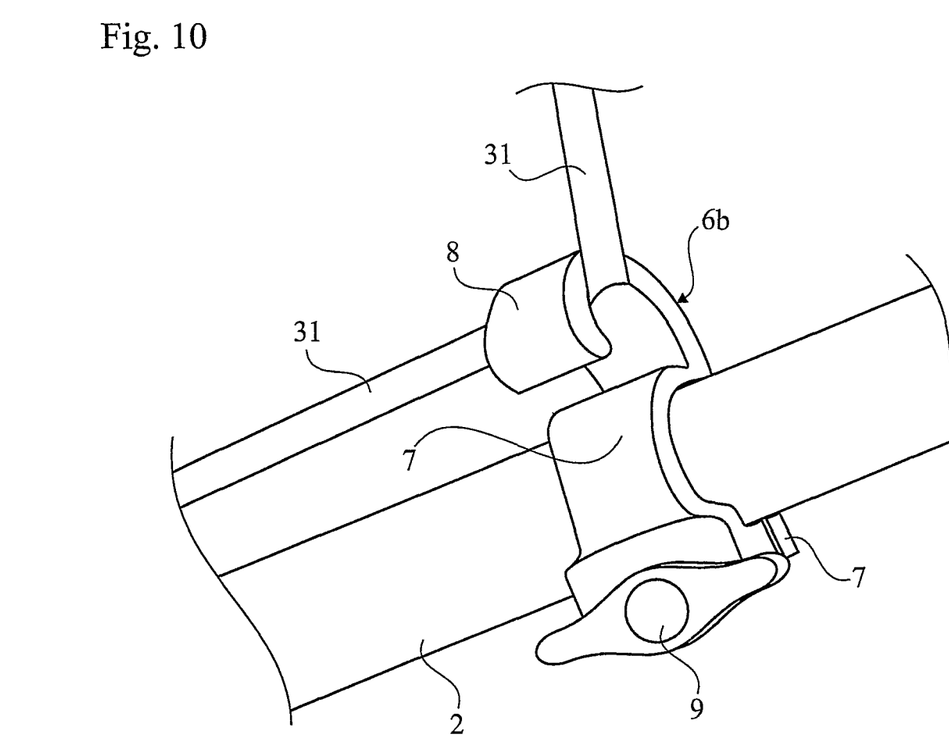
FIG. 10 is a perspective view of a movable hook-shaped fairlead mounted on the pole of the power tool.

A fairlead 6b including a hook is shown in FIG. 10 and has a generally 6-shaped structure. It comprises a ring-shaped lower member 7 and an upper hook member 8 extending therefrom over at least a quarter of the circumference of the ring member 7. The hook member 8 has a free end, which may extend a distance radially inward toward the ring member 7 to avoid that the strap 31 inadvertently leaves the hook member 8. The ring member 7 is open-ended, i.e. having not continuous but broken circumference, so that it can be clamped around the pole 2 by a tightening device 9 for adjusting the location of the fairlead in the longitudinal direction of the pole 2. In the embodiment shown in FIG. 10, the tightening device is a thumbscrew 9. After loosening the thumbscrew 9, the fairlead 6b can be displaced to a desired position along the pole 2 and then fixed again by tightening the thumbscrew 9.

The open-ended ring member 7 and the thumbscrew 9 together form means for adjusting the location of at least the second one 6b of the two fairleads in the longitudinal direction of the pole 2.

Figure 11A:
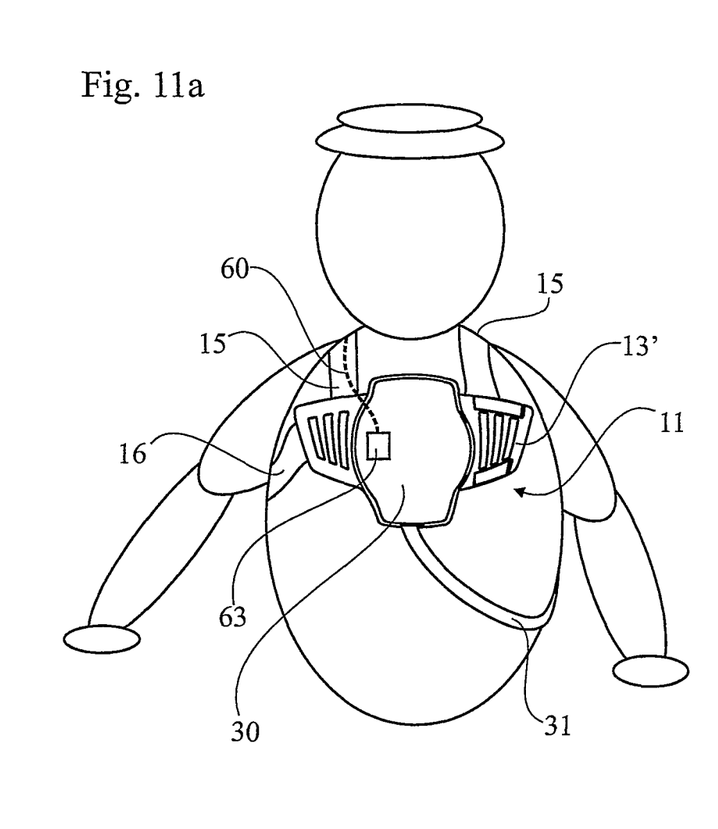
FIGS. 11a and 11b are simple sketches showing a rear view and a front view, respectively, of the operator wearing a harness according to an alternative embodiment of the invention where a tool balancer is mounted on a rear portion of the harness.
Figure 11B:
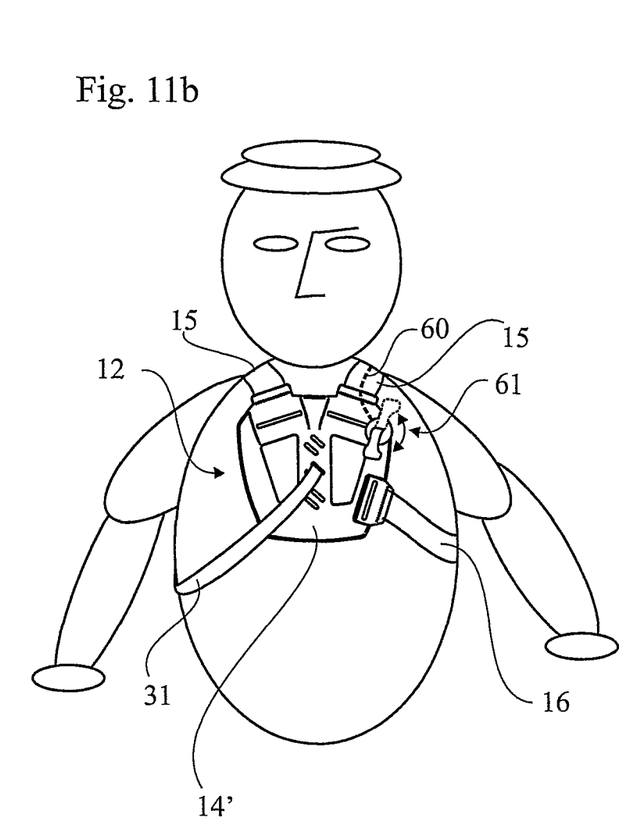

FIGS. 11a and 11b shows the operator wearing a harness according to an alternative embodiment of the invention where the tool balancer 30 is mounted on the back plate 13' of the harness 10. The tool balancer 30 includes a strap 31, a rotatable reel 32, on which at least part of the strap is wound, and a spring 33, at least indirectly connected to the strap 31 for balancing the weight of the power tool 1 to a desired extent. As seen the strap 31 extends downwards from the back plate 13'. The strap 31 has a free end adapted to be attached to the front portion 12 of the harness 10 and is intended to extend through at least one fairlead provided on the power tool 1.

A lock control cord 60, connected to a locking mechanism 63 of the tool balancer 30, runs in channel provided in one of the shoulder straps 15 from the back of the operator towards the chest plate 14' where the lock control cord 60 is attached to a lock operating mechanism 61. Turning the lock operating mechanism 61 towards a locking position stretches the lock control cord 60 thereby actuating the locking mechanism 63 of the tool balancer 30. The locking mechanism 63 could e.g. be implemented by a spring-loaded sprint which engages the rotatable reel 32 when the lock control cord 60 is non-stretched, to lock the rotatable reel 32, which sprint is disengaged when the lock control cord 60 is stretched unlocking the rotatable reel 32.

Figure 12A:
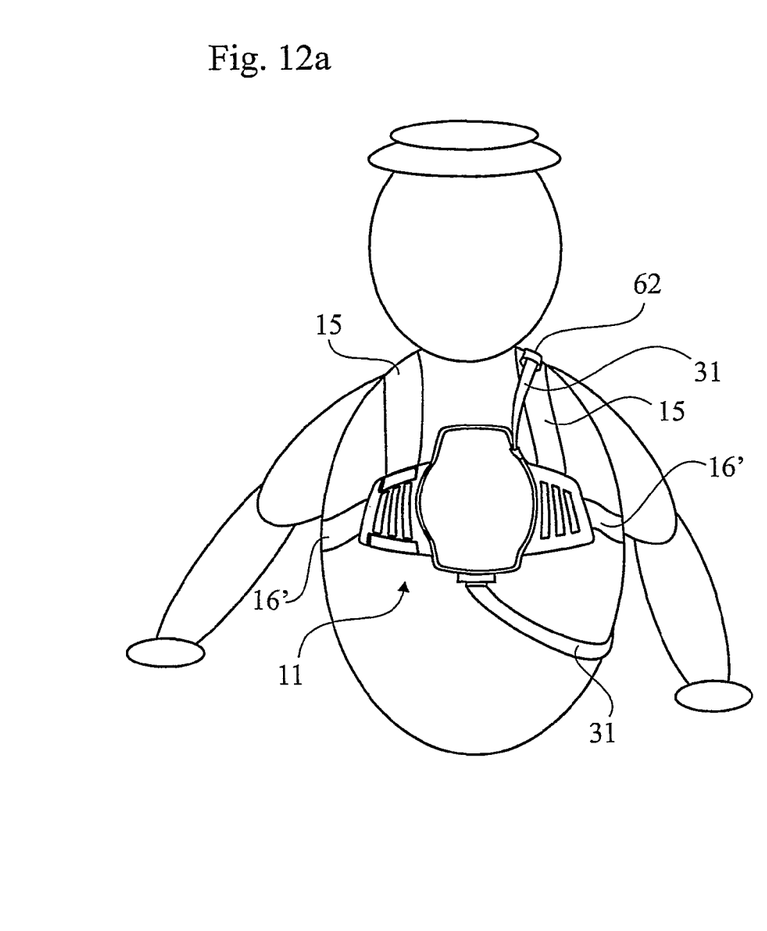
FIGS. 12a and 12b are simple sketches showing a rear view and a front view, respectively, of the operator wearing a harness according to yet an alternative embodiment of the invention where the tool balancer is mounted on the rear portion of the harness.
Figure 12B:
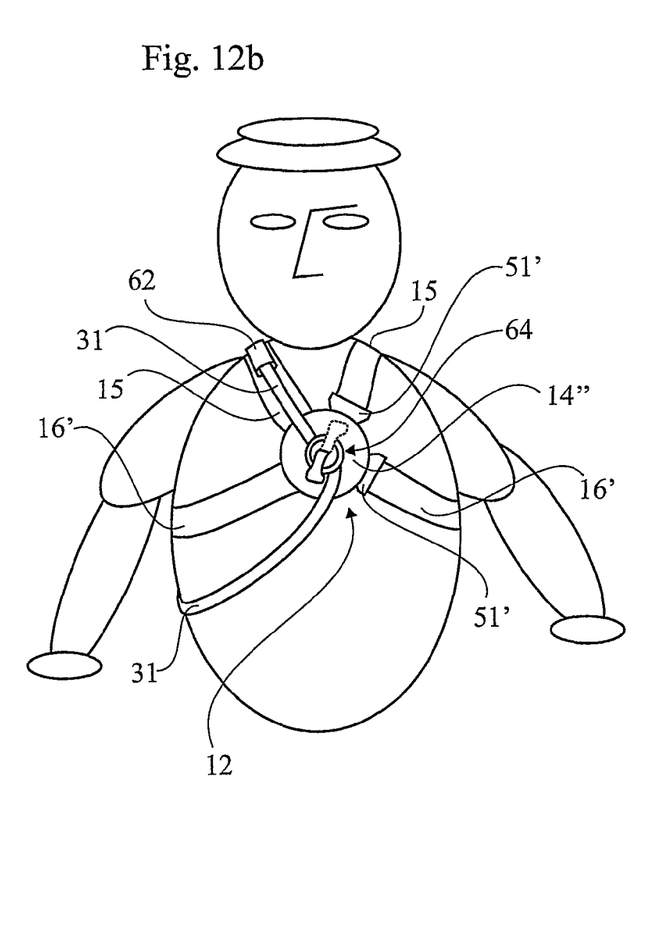

FIGS. 12a and 12b shows the operator wearing a harness according to another alternative embodiment of the invention where the tool balancer 30 is mounted on the back plate 13' of the harness 10. The tool balancer 30 includes a strap 31, a rotatable reel 32, on which at least part of the strap is wound, and a spring 33, at least indirectly connected to the strap 31 for balancing the weight of the power tool 1 to a desired extent. Here the strap 31 runs from the spring loaded rotatable reel 32, upwards over the shoulders, guided by a guidance member 62 at one of the shoulder straps 15 and back to the rear portion 11 of the harness 10. The strap 31 is guided through a passage in a strap locker 64 mounted on the chest plate 14". The strap locker 64 includes actuating means for tightening the passage therein, thereby locking the strap 31. Here two shoulder straps 15 and two side straps 16' connect the back plate 13' and the chest plate 14", one of the shoulder straps 15 and one of the side straps 16' connecting to the chest plate via latches 51'.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

It should be noted that even though the figures have shown a person holding the hand held power tool 1 pointing sideways—the hand held power tool 1 is normally held at the right hand side or the left hand side of the person (depending on if he is right handed or left handed) and having the active tool end 5 pointing in the forward direction.

According to a further embodiment; instead of using a tool balancer having a rotatable reel 32 it would be possible to have tool balancer comprising a tension coil spring or an elastic cord within a curved tubular housing extending over the shoulders from the back to the chest, the tubular housing having a first section attached at the rear portion 11 of the harness 10 and a second section, at which free end the tubular housing has an orifice, attached at the front portion 12 of the harness 10. The tubular housing is made of a rigid material, preferably light-weighted, such as e.g. aluminium or a hard plastic. The tubular housing could be integrated in one of the shoulder straps 15, but could also be made to extend over the shoulder with a gap between the shoulder and the tubular housing. A first end of the spring/cord is attached at the free end of the first section of the tubular housing and a second end of the spring/cord, located at a predetermined distance from the orifice, is connected to the strap 31, which strap 31 extends out through the orifice. In particular when using a tension coil spring in the tubular housing, the tubular housing is provided with a stopping arrangement preventing the tension coil spring from extending out through the orifice. When the strap 31 is subjected to a load the spring/cord extends thereby balancing the load. Preferably a locking arrangement is arranged at the first orifice of the tubular housing, in order to lock the strap 31 at a fix position in a similar fashion as for the lock of the rotatable reel 32.

According to yet a further embodiment; instead of using a tool balancer having a rotatable reel 32 it would be possible to have a tool balancer 30 comprising compression coil spring within a curved tubular housing extending over the shoulders from the back to the chest, the tubular housing having a first section attached at the rear portion 11 of the harness 10 and a second section, at which free end the tubular housing has an orifice, attached at the front portion 12 of the harness 10. The tubular housing is made of a rigid material, preferably light-weighted, such as e.g. aluminium or a hard plastic. The tubular housing could be integrated in one of the shoulder straps 15, but could also be made to extend over the shoulder with a gap between the shoulder and the tubular housing. A first end of the spring is attached to the tubular housing close to the orifice thereof and a second end of the spring, which when non-compressed is located close to the free end of the first section, is connected to the strap 31. The strap 31 extends through the compression coil spring towards and out through the orifice. When strap 31 is subjected to a load the compression coil spring is compressed thereby balancing the load. Preferably a locking arrangement is arranged at the first orifice of the tubular housing, in order to lock the strap 31 at a fix position in a similar fashion as for the lock of the rotatable reel 32.

Further instead of using a manually actuated lock it would be possible to have an electrically actuated lock by wire or wireless such as e.g. Bluetooth. For instance using a wireless solution a locking button could suitably be placed on the hand held power tool, preferably close to the its throttle control.

Industrial Applicability

Although the present invention has been described above with reference to a preferred embodiment where the harness has a strap intended to pass through two fairleads provided on a hand-held power tool for tree care or hedge trimming and including a pole interposed between the power source and the driven tool, it is obvious that the harness can be used for suspending hand-held power tools having a single fairlead. It would also be obvious to use the integrated chest plate and tool balancer assembly could be used in another harness than the one described.

The invention claimed is:

1. A harness comprising:
    a rear portion;
    a front portion;
    a first fairlead adapted to be coupled to a power tool;
    a second fairlead adapted to be coupled to the power tool at a distance from the first fairlead;
    a tool balancer attached to either the front portion or the rear portion, the tool balancer including a strap and an elastic element coupled to the strap and adapted to assist in balancing the power tool;
    said strap having one end adapted to be coupled to the front portion and having the other end adapted to be coupled to the rear portion, the strap is adapted to loop through the first fairlead and the second fairlead, thereby the strap is adapted to suspend the power tool.

2. The harness as claimed in claim 1, wherein said elastic element includes a rotatable reel, on which at least a part of the strap is wound, with the rotatable reel is spring loaded by a spring.

3. The harness as claimed in claim 2, wherein said spring exerts a substantially constant rewinding force on the strap irrespective of how much of the strap that is unwound from the reel.

4. The harness as claimed in claim 2, wherein the elastic element is lockable.

5. The harness as claimed in claim 1, wherein said elastic element includes a tubular housing having an elastic cord or spring which is coupled to the strap.

6. The harness as claimed in claim 1, wherein the first fairlead is adapted to be located near the power source end of the power tool, and the second fairlead is adapted to be located spaced therefrom toward the tool end of the power tool in the event a power tool is coupled to the hardness.

7. The harness as claimed in claim 1, further comprising a back plate and a chest plate, two shoulder straps, one for each shoulder of the operator, coupling the back plate with the chest plate, a generally horizontal side strap located on a side opposite of the operator's chest in relation to the power tool and likewise coupling the back plate with the chest plate, said chest plate being located in a position corresponding to an upper middle of the operator's chest but below the shoulders of the operator in the event a power tool is coupled to the hardness.

8. The harness as claimed in claim 7, wherein the rear portion includes a neck strap extending crosswise between the shoulder straps thereby the neck strap is adapted to assist in restraining the power tool from pulling the harness forward over the shoulders of the operator in the event a power tool is coupled to the hardness.

9. The harness as claimed in claim 1, further comprising a back plate and a chest plate, two shoulder straps, one for each shoulder of the operator, connecting the back plate with the chest plate, a generally horizontal side strap located on a side opposite of the operator's chest in relation to the strap adapted to receive the power tool and likewise connecting the back plate, the tool balancer being attached to the back plate.

10. The harness as claimed in claim 9, wherein the tool balancer is integrated in the back plate.

11. A hand-held power tool, said power tool having a pole, a power source mounted at one end of the pole, and a tool driven by the power source and mounted at the other end of the pole, wherein said power tool is provided with a harness according to claim 1.

12. A chest plate and tool balancer assembly for a harness according to claim 1, wherein the tool balancer is integrated in the chest plate.

13. A chest plate and tool balancer assembly as claimed in claim 1, wherein the chest plate is a buckle having one attachment point for each two shoulder strap latches and an additional attachment point for a side strap latch.

14. A hand-held power tool comprising
    a pole;
    a power source mounted at one end of the pole,
    a tool driven by the power source and mounted at the other end of the pole, and a harness configured to be coupled to the pole, the harness including a first fairlead, a second fairlead, a tool balancer, wherein the tool balancer attached to either a front portion or a rear portion of the harness, the tool balancer including a strap and an elastic element coupled to the strap and assisting in balancing the power tool, said strap having one end coupled to the front portion, looping through the first fairlead, looping to the second fairlead being spaced apart a distance from the first fairlead, and having the other end coupled to the rear portion, thereby suspending the power tool on the strap.

15. The hand-held power tool as claimed in claim 14, wherein at least one of the first and second fairleads is adapted to be adjusted along the pole in a longitudinal direction of the pole.

16. The hand-held power tool as claimed in claim 14, wherein the first and second fairleads each include at least one hook adapted to receive the strap.

17. A method of reducing the load on the arms of an operator, who wears a harness, in which a hand-held power tool mainly for tree care or hedge trimming is suspended, said power tool having a pole, a power source mounted at one end of the pole, and a tool driven by the power source and mounted at the other end of the pole, wherein providing a harness having a front portion or rear portion provided with a tool balancer, said tool balancer including a strap, a rotatable reel, on which at least part of the strap is wound, and a spring coupled to the strap and assisting in balancing the power tool in the event a power tool is coupled to the hardness, providing on the power tool a first fairlead and a second fairlead for the strap, and, inserting the strap through the first fairlead and the second fairlead and attaching the strap to the harness thereby forming a loop between the rear portion and the front portion.

18. The method as claimed in claim 17, wherein the second fairlead being located by the power source end of the pole, and the first fairlead being located spaced therefrom toward the tool end of the pole.

19. The method as claimed in claim 18, further comprising adjusting the longitudinal position of said second fairlead along the pole.

20. The method as claimed in claim 17, further comprising setting the spring to balance the weight of the power tool to a desired extent.

21. The method as claimed in claim 17, wherein said reel is lockable.

22. The method as claimed in claim 17, wherein said spring exerting a substantially constant rewinding force on the strap irrespective of how much of the strap is unwound from the reel.

23. A harness comprising:

a rear portion;

a front portion;

a first fairlead adapted to be coupled to a power tool;

a second fairlead adapted to be coupled to the power tool at a distance from the first fairlead;

a tool balancer attached to either the front portion or the rear portion, the tool balancer including a strap and an elastic element coupled to the strap and adapted to assist in balancing the power tool;

said strap having one end coupled to the front portion and having the other end coupled to the rear portion, the strap loops through the first fairlead and the second fairlead, thereby the strap is adapted to suspend the power tool.

* * * * *